(12) United States Patent
Nawata et al.

(10) Patent No.: US 10,725,359 B2
(45) Date of Patent: Jul. 28, 2020

(54) TERAHERTZ WAVE GENERATING DEVICE, OPTICAL PARAMETRIC AMPLIFIER, TERAHERTZ WAVE DETECTOR, AND NONLINEAR OPTICAL ELEMENT

(71) Applicant: RIKEN, Wako-shi, Saitama (JP)

(72) Inventors: Kouji Nawata, Wako (JP); Yu Tokizane, Wako (JP); Hiroaki Minamide, Wako (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 16/338,134

(22) PCT Filed: Sep. 26, 2017

(86) PCT No.: PCT/JP2017/034659
§ 371 (c)(1),
(2) Date: May 31, 2019

(87) PCT Pub. No.: WO2018/062136
PCT Pub. Date: Apr. 5, 2018

(65) Prior Publication Data
US 2020/0166822 A1    May 28, 2020

(30) Foreign Application Priority Data
Sep. 30, 2016   (JP) .................. 2016-192374

(51) Int. Cl.
*G02F 1/39*    (2006.01)
*H01S 3/108*   (2006.01)
*G02F 1/37*    (2006.01)

(52) U.S. Cl.
CPC ............. *G02F 1/39* (2013.01); *G02F 1/37* (2013.01); *H01S 3/108* (2013.01); *G02F 2203/13* (2013.01)

(58) Field of Classification Search
CPC .......... G02F 1/37; G02F 1/39; G02F 2203/13; H01S 3/108
See application file for complete search history.

(56) References Cited

U.S. PATENT DOCUMENTS 5,128,948 A    7/1992  Papuchon et al.
6,697,186 B2 * 2/2004  Kawase ............... G02F 1/39
                                              359/326

(Continued)

FOREIGN PATENT DOCUMENTS

JP    2004-279604 A   10/2004
JP    2006-91802 A    4/2006

(Continued)

OTHER PUBLICATIONS

S.E. Harris, "Proposed Backward Wave Oscillation in the Infrared", *Appl. Phys. Lett.*, dated 1966, 3 pages.

(Continued)

*Primary Examiner* — Daniel Petkovsek
(74) *Attorney, Agent, or Firm* — Seed IP Law Group LLP

(57) ABSTRACT

In order to accomplish highly-efficient nonlinear optical wavelength conversion for terahertz waves by using a simple configuration, an embodiment of the present invention provides a terahertz wave generating device 100 provided with a pump light source 104 that generates pump light LP of a single wavelength and a nonlinear optical element (periodical polarization inversion element) 102. The nonlinear optical element has a periodic structure in which the polarization or the crystal orientation is periodically inverted with a certain inversion period Λ. When the pump light enters the nonlinear optical element, idler light LI and signal light $L_{THz}$ are generated. The idler light and the signal light satisfy the law of conservation of energy for the pump light and a collinear phase matching condition for a virtual pump light wave vector $k'_p$ obtained by vector addition or (Continued)

subtraction of a grating vector $k_A$ which corresponds to the inversion period, to or from a pump light wave vector $k_p$ in the nonlinear optical element. The embodiment of the present invention also provides an optical parametric amplifier, a terahertz wave detector, and a nonlinear optical element.

20 Claims, 15 Drawing Sheets

(56) References Cited

U.S. PATENT DOCUMENTS

| | | | |
|---|---|---|---|
| 6,711,183 B1* | 3/2004 | Mizuuchi | G02F 1/3775 372/108 |
| 8,699,124 B2* | 4/2014 | Dunn | G02F 1/39 359/330 |
| 8,861,074 B2* | 10/2014 | Rae | G02F 1/3544 359/330 |
| 9,040,918 B2* | 5/2015 | Nawata | G02F 1/365 250/339.06 |
| 2009/0040597 A1* | 2/2009 | Rae | G02F 1/39 359/330 |
| 2014/0299773 A1 | 10/2014 | Nawata et al. | |

FOREIGN PATENT DOCUMENTS

| | | |
|---|---|---|
| JP | 2012-203013 A | 10/2012 |
| JP | 2014-203025 A | 10/2014 |

OTHER PUBLICATIONS

C. Canalias et al., "Mirrorless Optical Parametric Oscillator", *Nature Photonics*, dated 2007, 3 pages.

N. Umemura et al., "Sellmeier and Thermo-Optic Dispersion Formulas for the Extraordinary Ray of 5 Mol.% MGO-Doped Congruent LINBO3 in the Visible, Infrared, and Terahertz Regions", *Appl. Opt.*, dated 2014, 7 pages.

Huang et al., "Forward and Backward THz Difference Frequency Generation with Idler loss Exceeding Parametric Gain," *IQEC/CLEO Pacific Rim*, Sydney, Australia, Aug. 28-Sep. 1, 2011, pp. 1603-1605.

Montes et al., "Backward optical parametric efficiency in quasi-phase-matched GaN waveguide presenting stitching faults," *Optics Letters* 38(12):2083-2085, Jun. 15, 2013.

Pasiskevicius et al., "Mirrorless OPO: first steps towards unlocking the potential of counter-propagating three-wave interactions," *Proc. Of SPIE* vol. 6875:687508-1, 2008. (13 pages).

Wang et al., "Backward THz-wave Generation from Collinearly Phase-matched Difference-frequency Mixing in Periodically Poled Lithium Niobate," *OSA/CLEO/QELS*, 2008. (2 pages).

Weiss et al., "Tuning characteristics of narrowband THz radiation generated via optical rectification in periodically poled lithium niobate," *Optics Express* 8(9):497-502, Apr. 23, 2001.

Ding et al., "Mirrorless Optical Parametric Oscillators," *J. Nonlinear Optic. Phys. and Mat.* 5(2):223-246, 1996. (13 pages).

* cited by examiner

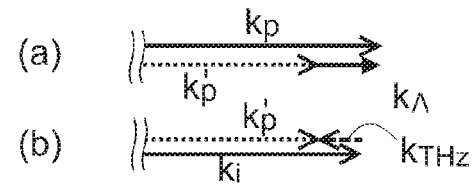
FIG. 7A (α=90deg)
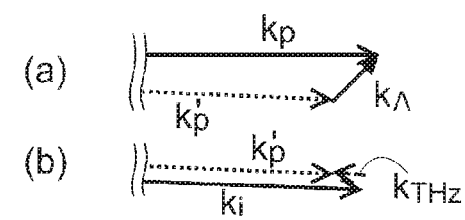
FIG. 7B (α=45deg)
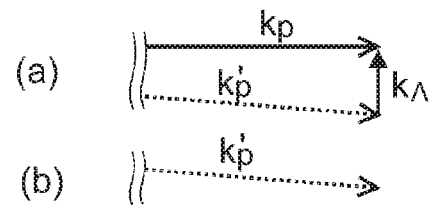
FIG. 7C (α=0deg)
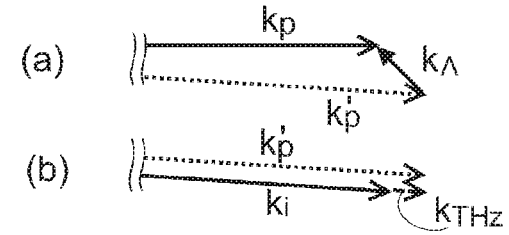
FIG. 7D (α=−45deg)
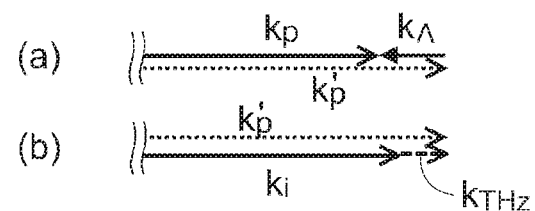
FIG. 7E (α=−90deg)

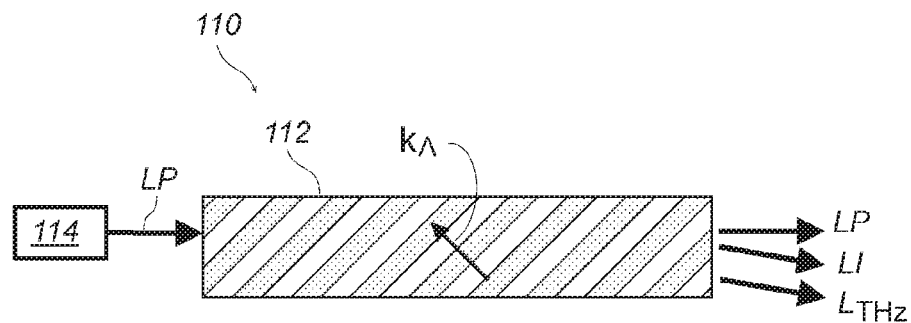
FIG. 9A
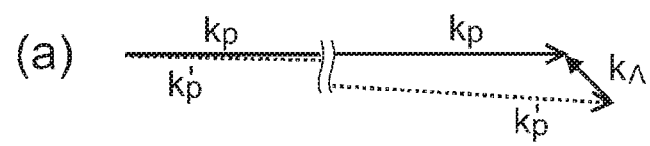
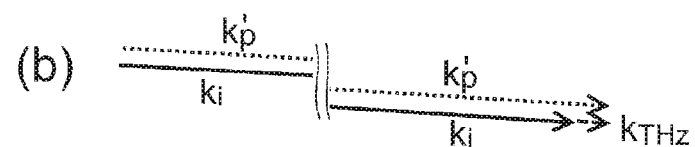
FIG. 9B

TERAHERTZ WAVE GENERATING DEVICE, OPTICAL PARAMETRIC AMPLIFIER, TERAHERTZ WAVE DETECTOR, AND NONLINEAR OPTICAL ELEMENT

TECHNICAL FIELD

The present invention relates to a terahertz wave generation device, an optical parametric amplifier, a terahertz wave detector, and a nonlinear optical element. More specifically, the present invention relates to a terahertz wave generation device, an optical parametric amplifier, and a terahertz wave detector capable of generating terahertz waves with high efficiency with a simple configuration, and a nonlinear optical element suitable for them with excellent efficiency.

BACKGROUND ART

In wavelength conversion technique based on nonlinear optical phenomena a condition known as phase matching is imposed on wave vectors, which corresponds to the law of conservation of momentum between propagating light waves and played a very important role in the field. A variety of phase matching conditions have been proposed, including, for example, a forward/backward phase matching, collinear/non-collinear phase matching, and pseudo-phase matching (QPM), and as a result, wavelength conversion efficiency has been improved and an effective wavelength range have been increased. Among others, optical parametric oscillation (OPO) utilizing backward phase matching presented by Harris in 1966 has been known as nonlinear optical wavelength conversion with unique characteristics (Non-Patent Document 1). This phase matching increases quantum conversion efficiency to the maximum, while adopting an extremely simple optical system (Non-Patent Documents 2 to 4). This is brought by a feedback effect occurring between the light waves propagating in the opposite direction in the nonlinear optical crystal.

An electromagnetic wave in a frequency range of the order of 0.1 THz to 100 THz (3 μm-3 mm in wavelength) is sometimes referred to as a terahertz wave and a wide application is expected. Therefore, improvement in practical use has been sought extensively, in a method of generating high output and high efficiency, a frequency variable light source over a wide range, room temperature operability, and so on. In particular, a coherent terahertz wave is expected to exhibit strong interaction with a substance and is considered as promising as the wavelength region includes a so-called fingerprint region; therefore, its efficient generation method has been searched in application fields such as detection of trace substances. The present coherent terahertz wave, in most cases, obtained by nonlinear wavelength conversion using a light source of a near-infrared laser. In order to realize the nonlinear wavelength conversion, a nonlinear optical crystal is disposed in an external resonator having mirrors or the like, which is provided with pump light for excitation. Most of such devices require laser light sources for a plurality of wavelengths and are large-scaled. The nonlinear wavelength conversion is also effective in a terahertz wave region, and terahertz wave generation has been realized by applying such techniques as in induced polariton scattering, difference frequency generation, light rectification effect, and so on.

CITATION LIST

Non-Patent Documents

Non-Patent Document 1: S. E. Harris, "Proposed Backward Wave Oscillation in the Infrared," Appl. Phys. Lett. 9, 114-116 (1966).

Non-Patent Document 2: Y. J. Ding and J. B. Khurgin, "Mirrorless optical parametric oscillators," J. Nonlinear Optic. Phys. Mat., 5, (2), 223-246, (1996); doi: 10.1142/S0218863596000179

Non-Patent Document 3: C. Canalias and V. Pasiskevicius, "Mirrorless optical parametric oscillator," Nature Photonics, Vol. 1, No. 8, 459-462, (2007); doi: 10.1038/nphoton.2007.137

Non-Patent Document 4: N. Umemura et al., "Sellmeier and thermo-optic dispersion formulas for the extraordinary ray of 5 mol. % MgO-doped congruent LiNbO3 in the visible, infrared, and terahertz regions," Appl. Opt., Vol. 53, No. 25, 5726-5732 (2014); doi: 10.1364/AO.53.005726

SUMMARY OF DISCLOSURE

Technical Problem

The present invention makes use of novel phase matching conditions, thereby it realizes terahertz wave generation and achieves highly efficient parametric amplification of terahertz waves with a simple configuration. The present invention contributes to the development of various applications using terahertz waves by providing a terahertz wave generation device, a parametric amplifier for a terahertz wave, a detection device, and a nonlinear optical element, with a simple configuration.

Solution to Problem

A detailed knowledge of phase matching suitable for generating terahertz waves has been obtained by the present inventors. We have then discovered that it is possible to realize optical parametric oscillation and generation with respect to the terahertz in a realistic manner by way of a simple apparatus configuration. In practice, it has been experimentally confirmed for the first time that the terahertz wave can be generated by the backward optical parametric oscillation under a special phase matching condition. Conventionally, a common bulk crystal or a periodic polarization inversion element could not be used for generating a terahertz wave based on backward optical parametric oscillation, due to specific properties of the backward phase matching condition per se. To solve this problem, the inventors have found a novel condition that achieves backward optical parametric oscillation. It is a collinear phase matching condition satisfied by a certain wave vector (referred to as a "virtual pump light wave vector" through the present application) obtained by incorporating the periodic inversion structure provided in the nonlinear optical crystal into the wave vector of the pump light, instead for the wave vector of the pump light alone. The signal light (terahertz wave) generated through the optical parametric oscillation in such a case is directed oppositely to the virtual pump light wave vector, generally in a reverse direction (hereinafter referred to as a "backward-propagating wave") when viewed from the direction of the pump light. In addition, the principle is extended to a more general configuration. Accordingly, the present invention is applicable to light directed generally to the same direction ("forward-propagating wave") with respect to the pump light using the virtual pump light wave vector and it is confirmed that the terahertz wave can be actually generated. Thus, the present invention is based on the novel phase matching conditions found by the inventors.

Therefore, provided in one aspect of the present invention is a terahertz wave generation device, comprising: a pump light source for generating pump light of a single wavelength; and a nonlinear optical element having a periodic structure in which polarization or crystal orientation is periodically inverted in an inversion period, wherein the nonlinear optical element is configured to generate idler light and signal light when the pump light is incident thereon, the idler light and the signal light satisfying a collinear phase matching condition with respect to a virtual pump light wave vector and the law of conservation of energy with respect to the pump light, and wherein the virtual pump light wave vector is obtained by vector addition or subtraction of a grating vector corresponding to the inversion period and a pump light wave vector in the nonlinear optical element.

In another aspect of the present invention, an optical parametric amplifier and a terahertz wave detection device are also provided. In addition, a nonlinear optical element is also provided in yet another aspect of the present invention.

Regardless of whether a terahertz wave is generated by a backward-propagating or by a forward-propagating wave, the virtual pump light wave vector is one obtained by addition or subtraction in vector calculus of a pump light wave vector and a grating vector that represents periodicity in the periodic polarization inversion. The direction of the virtual pump light wave vector is substantially the same as the direction of the pump light wave vector, however it is not always necessary that the directions coincide with each other in a general condition. The virtual pump light wave vector is introduced herein for describing the invention with clarity. Therefore, the expression with the virtual pump light is set forth herein, only for describing a wave vector of it or the virtual pump light wave vector. It is not particularly limited in the present invention, as to whether an electromagnetic wave corresponding to such a wave vector is actually generated or not, or as to whether it actually works as a medium or not.

It is to be noted that general terminology in the field of the invention is utilized in the present application, as long as it does not make the description unclear. For example, terms in the field of optics, or "light", "light source", "light emission", "refraction" and the like are used even for electromagnetic waves and electromagnetic radiation in infrared radiation or radiation in terahertz range, which are not visible. Thus, a signal light, which is one of terahertz waves, refers to electromagnetic radiation in the terahertz region. In addition, the wavelength of the light and the terahertz wave is a value in vacuum by convention, unless otherwise specified. Further, although the expression of idler light has been provided for light which is often not used or for one which is mere a by-product, the expression may be used as it is in this application for consistency in the description, regardless of whether it is effectively used or not. The apparatus described as a terahertz wave generation device of the present embodiment may be an idler light generating device, as it may function as an apparatus for generating idler light.

Advantageous Effects of Disclosure

A terahertz wave can be generated or amplified with high efficiency with a simple configuration in a terahertz wave generator, an optical parametric amplifier, a terahertz wave detection device, and a nonlinear optical element described in the present invention.

BRIEF DESCRIPTION OF DRAWINGS

FIG. 7 is a schematic diagram of momentum within an XY plane under various conditions in an embodiment of the present invention.

FIG. 9 includes schematic diagrams depicting a structure of a terahertz generation device for generating signal light of a terahertz wave of a forward-propagating wave: a plan view schematically showing a typical arrangement of a nonlinear optical element, pump light, signal light, and idler light (FIG. 9A), and a schematic diagram of moment showing the relationship between the wave vectors (FIG. 9B).

FIG. 10 includes schematic diagrams depicting structures of frequency scan type terahertz wave generation devices with a rotation mechanism for a periodic polarization inversion element in an embodiment of the present invention.

FIG. 12 includes schematic diagrams depicting structures of optical parametric amplifiers in an embodiment of the present invention.

FIG. 13 includes schematic diagrams depicting configurations of terahertz wave detection devices according to an embodiment of the present invention.

DESCRIPTION OF EMBODIMENTS

Figure 1A:
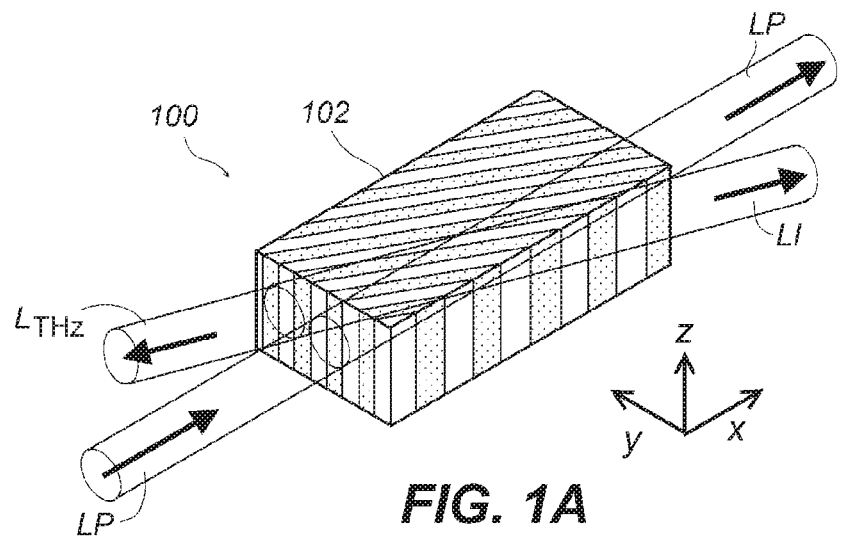
FIG. 1 includes schematic diagrams showing a typical arrangement of a nonlinear optical element, pump light, signal light, and idler light (FIG. 1A), its plan view (FIG. 1B), and a schematic momentum diagram depicting a mutual relationship among wave vectors in a periodic polarization inversion element (FIG. 1C) adopted in an embodiment of the present invention.

Hereinafter, the principle of the present invention is described, and further, embodiments of a terahertz wave generation device, a terahertz wave parametric amplifier, a detection device, and a nonlinear optical element will be described with reference to the drawings. In the description, like reference numerals designate corresponding or identical elements throughout the various drawings.

1. Generation of Terahertz Wave Under Novel Phase Matching Condition 1-1. Typical Example of Phase Matching Conditions Influenced by Grating Vector In a differential frequency generation (DFG) or a parametric oscillation using a nonlinear optical crystal, signal light of a target wavelength, such as a terahertz wave, is generated from pump light. The efficiency of it is strongly influenced by a phase matching condition. A nonlinear optical element whose direction of polarization or the crystal orientation is periodically inverted has also been used for a QPM (pseudo phase matching), which is one of conventional phase matching conditions. In the QPM, a nonlinear optical element having an inversion structure whose inversion period is twice the coherence length is adopted, where the inversion structure is realized by alternating directions of polarization or a crystal orientation. In this embodiment, a nonlinear optical element whose polarization direction or crystal orientation is periodically inverted is also used to realize parametric wavelength conversion. The nonlinear optical element of this embodiment has an inverted structure similar to that for QPM, however it is manufactured to satisfy a novel phase matching condition found by the present inventors. In the first place, a typical example regarding the phase matching conditions found by the present inventors is described, and its general description will be set forth later.

Figure 1B:
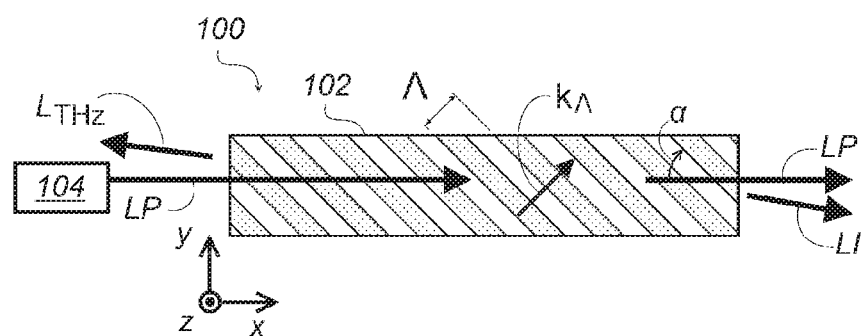
Figure 1C:
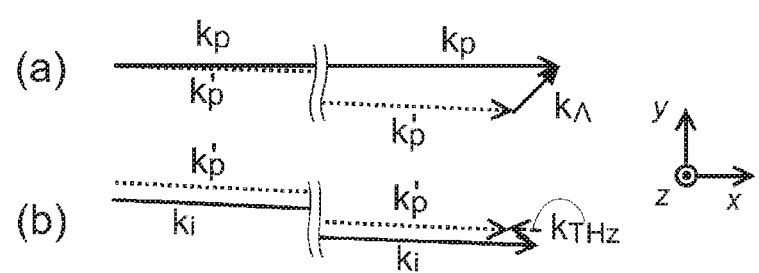

FIG. 1 includes schematic diagrams showing a configuration of a nonlinear optical element 100: a perspective view schematically indicating a typical arrangement of a periodic polarization inversion element 102 as well as a pump light LP and the signal light $L_{THz}$, and idler light LI (FIG. 1A), its plan view (FIG. 1B), and a schematic momentum diagram depicting a mutual relationship among wave vectors in the periodic polarization inversion element 102 (FIG. 1C).

The pump light LP is single-wavelength light output from a pump light source 104, which is typically a laser such as an Nd:YAG laser or a semiconductor laser. The wavelength may be selected from a variety of wavelengths. Suitable for the pump light LP is one in a wavelength range in which the periodic polarization inversion element 102 does not show absorption, or preferably any lasers with a wavelength of an infrared region or a visible region of around 1 to 10 μm. The pump light LP is incident on the periodic polarization inversion element 102 via a suitable telescope optical system. In this embodiment, only one single light source of a single wavelength is used for the pump light LP and a plurality of light sources are not necessary. The pump light LP may be a CW laser or pulse lasers.

The periodic polarization inversion element 102 has a periodic structure in which the orientation of polarization is periodically inverted in a certain inversion period Λ. Since a nonlinear optical element having a periodic structure due to inversion of a crystal orientation has the same as that in the periodic polarization inversion element 102, any part of the description of the periodic polarization inversion element 102 should be regarded as describing the periodic structure due to inversion of the crystal orientation. The periodic polarization inversion element 102 is preferably made of a material which does not exert absorption for the pump light LP and the signal light $L_{THz}$. In this application, a suffix with THz such as $L_{THz}$ is used, as a terahertz wave is one of typical examples for the signal light. Also, the explicit arrow indication or bold font convention for vector symbol is omitted even for vectors. Typical examples of the periodic polarization inversion element 102 include PPLN (Periodically Poled Lithium Niobate, a typical of inverted polarization direction, and OP-GaAs (Orientation-Patterned Gallium Arsenide), a typical of inverted crystal orientation. In the drawing of the present application, the inversion in the polarization direction or crystal orientation is depicted by a region where minute points are added and a region which is not added, regardless of whether the inversion is realized by the electrode structure or the substrate structure. A pump light LP having an intensity exceeding a certain threshold value is incident on the periodic polarization inversion element 102, the idler light LI in a direction substantially along the pump light LP and the signal light $L_{THz}$ in a direction substantially opposite to that of the pump light LP are generated (FIG. 1A). Additional light sources other than the pump light are not required for that operation, as described above. The grating vector $k_Λ$ corresponding to the inversion period Λ has a magnitude of $k_Λ=2π/Λ$ with a direction along the direction of the inversion period, that is, the normal direction of layers forming the inversion structure. Concerning the pump light LP, the idler light LI, and the signal light $L_{THz}$, it is possible to conceive a wave vector for expressing a wavelength inside of periodic polarization inversion elements 102 (which is a wavelength in a vacuum divided by the refractive index at the wavelength of the periodic polarization inversion element) and the traveling direction of the wave front.

One typical phase matching condition of this embodiment is not one defiled within wave vectors $k_p$, $k_i$, and $k_{THz}$ of the pump light LP, the idler light LI, and the signal light $L_{THz}$ respectively, but one defined with them and a grating vector $k_Λ$ additionally. The phase matching condition is for generating high-efficiency optical parametric oscillation in the periodic polarization inversion element 102 and is defined by establishing the following relationship simultaneously in the periodic polarization inversion element 102 (FIG. 1C):

$$k_p - k_Λ = k_i - k_{THz} \quad (1)$$

$$k_{THz} // -k_i \quad (2)$$

Here, the symbol "//" denotes that the vectors of both sides connected by this symbol are parallel and oriented to the same direction (or simply "parallel"). Thus, equation (2) expresses that $k_{THz}$ and $k_i$ are anti-parallel with each other.

At this time, a virtual wave vector (a virtual pump light wave vector $k'_p$) is introduced as follows.

$$k'_p = k_p - k_Λ \quad (3)$$

The equation (1) is then rewritten into the following equation:

$$k'_p = k_i - k_{THz} \quad (4)$$

Vectors arrangements representing equations (3) and (4) are illustrated in FIG. 1C, (a) and (b). In FIG. 1C (b), in addition to the arrangement by equation (4), the anti-parallel configuration by equation (2) is also indicated (collinear phase matching). The magnitudes of the actual wave vectors are such that only $k_A$ and $k_{THz}$ are extremely shorter than the others. Therefore the central part in a direction along the $k_p$ (x-axis direction) is omitted in the figure. The virtual pump light wave vector $k'_p$ and the idler light wave vector $k_i$ are drawn to have a deviation in the y direction between both sides of the omission part in FIG. 1C because of the difference in the directions of the virtual pump light wave vector $k'_p$ and the pump light wave vector $k_p$. However, the deviation in the direction of the virtual pump light wave vector $k'_p$ in the periodic polarization inversion element 102 of the present invention from the pump light wave vector $k_p$ is actually about 0.5° at most.

The equation (4) defines the virtual pump light wave vector $k'_p$ as vector subtraction of the signal light wave vector $k_{THz}$ from the idler light wave vector $k_i$. This represents the law of conservation of momentum in terms of wave vectors. In other words, equation (4) means that the periodic polarization inversion element 102 with inclined inversion structure by an angle α from the direction of the pump light (FIG. 1B) requires modification to the law of conservation of momentum for the light propagating therethrough, because of periodicity and orientation of the inversion structure. However, what the equation (4) requires for the signal light wave vector $k_{THz}$ and the idler light wave vector $k_i$ is to be identical to the virtual pump light wave vector $k'_p$ after the vector subtraction operation. The collinear phase matching condition holds only when the relationship of the equation (2) is added, where the equation (2) requires the signal that the signal light wave vector $k_{THz}$ and the idler light wave vector $k_i$ be anti-parallel to each other. The requirement of the collinear arrangement (or coaxial arrangement) is a condition for actually causing parametric wavelength conversion efficiently. That is, the wave vector of the signal light $k_{THz}$ is in the opposite direction to that of the virtual pump light wave vector $k'_p$ in the periodic polarization inversion element 102. Therefore, the signal light in the periodic polarization inversion element 102 having that wave vector is opposite to the virtual pump light wave vector $k'_p$, that is, in an almost reverse direction with respect to the pump light wave vector $k_p$. It means that the signal light travels as a backward-propagating wave. It is true that the virtual pump light wave vector $k'_p$ and the pump light wave vector $k_p$ are not parallel or anti-parallel to each other when the grating vector $k_A$ is inclined from the pump light wave vector $k_p$. However, in the present embodiment, since the grating vector $k_A$ is small, the terahertz wave or the signal light substantially propagates as a backward-propagating wave for the pump light. It should be noted that the equation (4) is different from the conventional backward phase matching condition, which is a condition that would be satisfied by the pump light wave vector $k_p$, in that it should be satisfied by the virtual pump light wave vector $k'_p$. Although the direction changes due to refraction when emitted from the periodic polarization inversion element 102 to the outside, amount of the change is small for the arrangement in FIG. 1B. Therefore, it can be said that the terahertz wave, which is the signal light $L_{THz}$, travels substantially opposite to the pump light LP. In the present application, there is no need to distinguish inside or outside of the periodic polarization inversion element 102.

Furthermore, an advantage that can be expected for the backward phase matching with a collinear arrangement is realized substantially in the present embodiment, as the signal light $L_{THz}$ is a backward-propagating wave with a deviation of about 0.5° from the pump light LP. In other words, high conversion efficiency can be expected for the phase matching condition as defined by equations (2) and (4) for the virtual pump light wave vector $k'_p$. As long as the grating vector $k_A$ is small, the phase matching condition sufficiently increases a volume ("interaction volume") in the crystal where the pump light LP is interacted and converted into the idler light LI and the signal light $L_{THz}$. In particular, parametric oscillation often requires a feedback optical system such as an external resonator for its operation, oscillation is experimentally confirmed in the present embodiment without such optical systems. This is a piece of evidence that the collinear arrangement actually works for backward optical parametric oscillation. That is, the pump light LP having an intensity equal to or higher than a certain level incidents on the periodic polarization inversion element 102, a signal light $L_{THz}$ of a terahertz wave and idler light LI are generated by parametric wavelength conversion. Generated terahertz wave signal light $L_{THz}$ acts as seed light for parametric amplification operation while propagating in a substantially opposite direction toward the incident direction of the pump light LP.

The left hand side of the equation (1), $k_p-k_A$, which stands for a vector subtraction, may be expressed by vector addition, $k_p+k_A$ with an inverted definition of the grating vector $k_A$. The definition of the grating vector $k_A$ can be defined by inverting itself, the virtual pump light wave vector $k'_p$ is defined by either vector addition or subtraction accordingly.

In this way, a nonlinear optical element where a periodic structure having polarization and crystal orientation inversion is inclined (oblique-period polarization inversion element) is adopted. Actual operation of terahertz wave parametric oscillation is realized accordingly. A parametric oscillation for obtaining a terahertz wave of a backward-propagating wave, which is obtained as a result of the above, is realized by supplying the pump light LP having a single wavelength (monochromatic) of an intensity that exceeds a threshold to a nonlinear optical element that is designed appropriately. It is advantageous in the high efficiency of generation of the resulting terahertz wave. Furthermore, it is advantageous that the parametric oscillation can be realized without depending on a feedback optical system, such as an external resonator that requires precise adjustment. This leads to so-called auto-feedback action. That is, the terahertz wave generation device according to the present embodiment becomes a terahertz light source with a significantly simplified structure without requiring such optics as the external resonator for the oscillation operation. The number of parts requiring high precision in mechanical accuracy and setting conditions is reduced. Therefore, the resulting system should be practical because it would be operated stably.

The following relationship can be found in the collinear phase matching condition of the present embodiment that is satisfied by the virtual pump light wave vector $k'_p$ shown in FIG. 1C. The idler light wave vector $k_i$ is in parallel arrangement with respect to the virtual pump light wave vector $k'_p$, and the magnitude of the idler light wave vector $k_i$ is larger than that for the virtual pump light wave vector $k'_p$. In contrast, the signal light wave vector $k_{THz}$ is in anti-parallel arrangement with respect to both of the virtual pump light wave vector $k'_p$ and the idler light wave vector $k_i$. Therefore, the signal light as the terahertz wave becomes a backward-propagating wave travels in an almost reverse direction when viewed from the pump light LP.

The conditions of equations (2) and (4) denote a collinear phase matching for efficiently generating a nonlinear optical phenomenon and the law of conservation of momentum derived from the property of space represented by the periodicity of the inversion structure of the periodic polarization inversion element 102 and the periodicity of the electromagnetic wave. However, the combination of the signal light wave vector $k_{THz}$ and the idler light wave vector $k_i$ cannot be specified only by these properties. Actually, each of the signal light wave vector $k_{THz}$ and the idler light wave vector $k_i$ is determined, including their magnitude, when a law of conservation of energy is additionally imposed. In other words, an additional condition that the sum of the photon energies for the signal light and the idler light must match the photon energy of the pump light is imposed, as a result, a restriction is added to the magnitude of the wave vectors of the signal light and the idler light. The combination of the magnitudes (norms) of the vector of each of the wave vector $k_{THz}$ and the idler light wave vector $k_i$ of the signal light in FIG. 1C is determined so as to satisfy the law of conservation of energy. In such a condition by which the signal light wave vector $k_{THz}$ of the backward-propagating wave is generated, the norm of the virtual pump light wave vector $k'_p$ becomes smaller than that of the pump light wave vector $k_p$. It should be noted that, although the collinear phase matching is directed to the virtual pump light wave vector $k'_p$, the law of conservation of energy is directed to the pump light prior to the vector addition or subtraction of the grating vector.

1-2. Suppressing Unnecessary Nonlinear Wavelength Conversion

Figure 2:
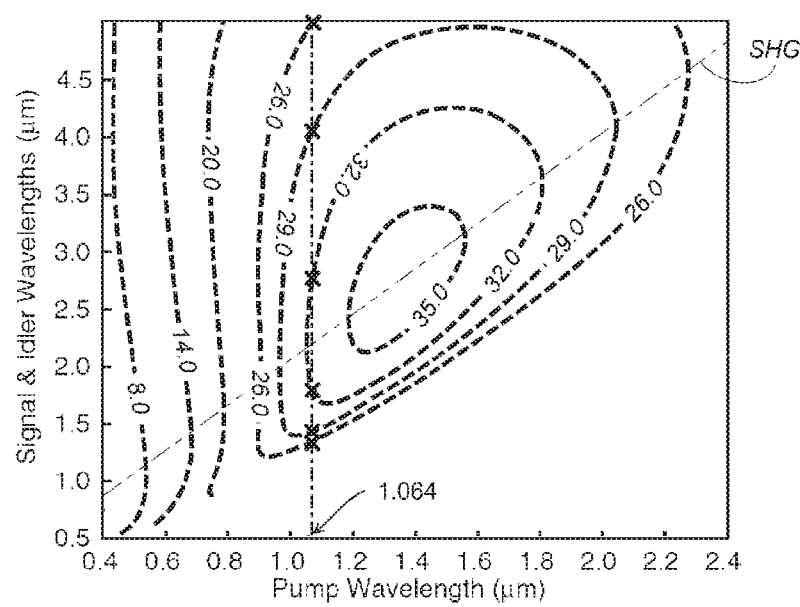
FIG. 2 is a graph of theoretically calculated characteristics indicating wavelengths for idler light and the signal light vs wavelength of pump light for various inversion periods for a PPLN having a polarization reversal structure in an embodiment of the present invention.

In the present embodiment, it is preferable to suppress a parametric wavelength conversion process for undesirable oscillations in the configuration shown in FIG. 1. Specifically, it is preferable that the inversion structure of the periodic polarization inversion element 102 is made such that any phase matching conditions for an undesirable parametric wavelength conversion or for unwanted SHG (second-harmonic generation), in particular, phase matching within the optical wavelength band, are not satisfied. It is also possible to realize such a structure while satisfying the conditions in equations (2) and (4) mentioned above. FIG. 2 is a graph of theoretically calculated characteristics indicating wavelengths for idler light and the signal light vs wavelength of pump light for various inversion periods for a PPLN (5 mol % MgO added) having a polarization reversal structure. The theoretical calculation takes into account Sellmeier equation for an extraordinary ray and temperature characteristics. FIG. 2 is calculation results at a temperature of 20° C. and for normal incidence ($\alpha=90°$) as an example (Non-Patent Document 4). Numerical values indicated on broken line curves are of the inversion period Λ (unit: μm); the horizontal axis represents the wavelength of the pump light; and the vertical axis represents the wavelength of the signal light or the idler light. Each curve shows that the signal light and the idler light having values on the vertical axis can be output when one or more values are given on the vertical axis by the curve for a pump light on the horizontal axis. For the sake of illustration, a pump light having a wavelength of 1.064 μm, which is shown by a straight line of the one-dot chain line in the vertical direction of the sheet is described. For this pump light wavelength, each curve for inversion periods Λ=32 μm, 29 μm, and 26 μm has two intersection points indicated by the × marks. In addition, a straight line of a two-dot chain line diagonally rising to the right in the drawing represents conditions for SHG, which traces points where said two intersecting points meet at a point on a straight line extending parallel to the vertical axis (i.e., a position where the curve has a tangential line in parallel with the vertical direction). This shows that, for pump light having a wavelength of 1.064 μm, signal light and idler light are generated in a shorter wavelength region than the optical wavelength band, which is a wavelength band from 3 μm to 3 mm, in the cases of the inversion periods Λ=32 μm, 29 μm, and 26 μm, and that the second harmonic is generated in the case Λ is slightly larger than 32 μm (not shown). In other words, when we adopt an inversion period Λ corresponding to a curve having an intersection within the optical wavelength band, such as the infrared region, for given pump light, a parametric wavelength conversion process or an SHG occurs at unintended wavelengths. Since such conditions would consume energy by way of an unnecessary optical wavelength band, it is undesirable for generating the terahertz wave. On the other hand, for example, in the case when a periodic polarization inversion element 102 has the inversion period Λ=35 μm, neither signal light nor idler light exists in the optical wavelength band for pump light having a wavelength of 1.064 μm. It follows that, the periodic polarization inversion element 102 having such an inversion period allows to efficiently generate the targeted terahertz wave. In this regard, it can be said that a condition where curves as in FIG. 2 cannot be drawn is preferable, as it will not consume energy in the optical wavelength band. As can be seen from the above description, it is possible to determine conditions that do not satisfy phase matching that may lead to undesired parametric wavelength conversion or SHG, in particular, phase matching within the optical wavelength band, based on calculation in accordance with the wavelength of the pump light and the crystal used for the pump light. Additionally, such conditions can be determined by a suitable preliminary experiment. In order to prevent conditions that may lead to undesired parametric wavelength conversion or SHG, in particular, phase matching within the optical wavelength band, it is preferable to adopt a periodic polarization inversion element 102 with different nonlinear optical materials or with different crystal orientations, or to adopt different wavelength for the pump light, in addition to appropriately adjusting the inversion period Λ of the periodic polarization inversion element 102 as exemplified above.

1-3. Effect of Angle

In a periodic polarization inversion element 102 of the present embodiment, there is no limitation by nature on ranges of directions for both the grating vector $k_A$ of the inversion structure and the wave vector $k_p$ of the pump light (FIG. 1B; angle α). In a typical case, a grating vector $k_A$ of the inverted structure in the periodic polarization inversion element 102 and the direction of the wave vector $k_p$ of the pump light incident on it forms an angle other than −90° or 90°. In this case, the direction of the wave vector $k_p$ of the pump light and the direction of the virtual pump light wave vector $k'_p$ are not parallel or anti-parallel to each other in the periodic polarization inversion element 102.

The frequency of the generated terahertz wave is influenced by an angle α. Conversely, the wavelength of the terahertz wave, which is the signal light, can be adjusted by the angle α of the inversion structure of the nonlinear optical element with respect to the pump light. This means that the wavelength can be easily adjusted by changing the orientation of the periodic polarization inversion element for pump light 102 against the pump light. As described above, signal light (a terahertz wave) and idler light are determined so that their wave vectors satisfy the collinear phase matching condition (equations (2) and (4)) and their wavelengths satisfy the law of conservation of energy. Due to these conditions, the angle α affects the wavelength of the terahertz wave. In this embodiment, when the angle α is 90°, the propagation direction of the terahertz wave is completely reverse direction of the pump light, which is a backward terahertz wave parametric oscillation. A general theory in which the angle α is changed will be described later with reference to, for example, FIG. 6.

1-4 Nonlinear Optical Materials

Various nonlinear optical materials can be used for the periodic polarization inversion element 102 of this embodiment. For the present embodiment, it is possible to adopt common nonlinear optical elements, including one that is manufactured so as to have an inverted structure for QPM, and another manufactured with inverted crystal orientations. The inversion period A shown in FIG. 1B is one that has adjusted polarizations or crystalline orientations from these common nonlinear optical elements. A non-exhaustive example list of such a nonlinear optical material preferred in the present embodiment may include PPLN (Periodically Poled Lithium Niobate, LiNbO3), PPKTP (Periodically Poled Potassium Titanyl Phosphate, KTIOPO 4), PPSLT (Periodically Poled Stoichiometric, LiTaO3), and OP-GaAs (Orientation-Patterned Gallium Arsenide).

1-5. Conditions for Highly Efficient Terahertz Wave Generation

In the terahertz generation method of the present embodiment, various techniques for enhancing conversion efficiency from a pump wave can be added and adopted. One of them is related to a structure of the nonlinear optical element, where the structure has a waveguide function for allowing a terahertz wave, which is a signal light, to propagate therethrough. The nonlinear optical element is typically fabricated in a rectangular parallelepiped, as shown in, for example, FIG. 1A. The nonlinear optical element acts as a waveguide itself, as its refractive index is as high as 5 for a terahertz wave, therefore, the terahertz wave propagates backwardly to the x axis direction, or to −x direction, while being confined in the waveguide. The confined terahertz wave acts as seed light for the pump light when propagating backwardly. The nonlinear optical element having a high refractive index becomes a waveguide, which is advantageous for its increased the interaction volume. Various types of waveguide structures for terahertz waves can be adopted, for example, it is also advantageous to provide a silicon guide at the periphery of it.

Furthermore, in the present embodiment, it is advantageous for the pump light source to have a relatively large pulse width as compared with a conventional femtosecond laser or the like. It has been common in the field to adopt a light source with a compressed pulse width, such as a femtosecond pulse, for the pump light source for efficient nonlinear optical effect. In contrast, for the pump light source in the present embodiment it is preferable to adopt a laser source that generates coherent pump light pulses. It is particularly preferable to adopt one with a pulse width between 30 picosecond to 1 nanosecond, both inclusive. If a pump light pulse is an extremely short pulse, the distance contributing to the interaction is shortened when the signal light (terahertz wave) of backward-propagating wave returns toward the pump light. Therefore, it is advantageous to have a relatively large pulse width in the operation of the present embodiment, which utilizes auto-feedback by, for example, a backward-propagating wave. This point leads to high practicality, because a large-scale and expensive femtosecond bulk laser is not required. In addition, since relatively wide pulse width corresponds to narrow frequency line width governed by Fourier limit, the wide pulse width is advantageous to realize a good monochromatic light source, which can be used for applications requiring a narrow bandwidth in frequency, such as spectroscopy.

Moreover, the pump light source in the present embodiment can be expected to operate even with a continuous wave (CW) laser. When a periodic polarization inversion element 102 having a sufficient size is used, it is possible to have sufficient time for the signal light (terahertz wave) of a backward-propagating wave to interact with the pump light, and the Fourier limit for determining the narrowing of the frequency width is changed. Therefore, the CW laser is advantageous in that resulting terahertz wave may exhibit improved monochromatic continuous wave oscillation.

In addition, it is advantageous to control the temperature of the periodic polarization inversion element 102 in the present embodiment to an appropriate range. The periodic polarization inversion element 102 has linear optical constants (e.g., absorption) and nonlinear optical constants of its material, which are generally dependent on temperature. Therefore, it is preferable to provide a temperature control device that keeps the periodic polarization inversion element 102 at an appropriate temperature for realizing a desired operation. For operation in a wavelength region accompanied by absorption, it is advantageous to control temperature of the periodic polarization inversion element 102 for continuing operation over a necessary duration, as the periodic polarization inversion element 102 may be heated. For example, in the case the periodic polarization inversion element 102 is made of lithium niobate (LiNbO3, hereinafter referred to as "LN") preventing temperature increase by, for example, providing an element or a member for cooling the periodic polarization inversion element 102, and a temperature controller with temperature adjusting device allows to keep the absorption coefficient small and maintain the nonlinear optical constant at a desired value. Therefore, it is advantageous to provide additional means for cooling in the operation of generating the terahertz wave with high efficiency with the periodic polarization inversion element made of LN.

2. Experimental Verification 1

2-1. Confirmation of Terahertz Wave Generation

Next, we describe an experiment in which terahertz wave oscillation was actually confirmed based on a typical one of the novel phase matching conditions of the present embodiment. In the confirmation of the present embodiment, LN was adopted for the periodic polarization inversion element 102 that satisfies the above-described special phase matching condition. In particular, a periodically poled lithium niobate (size 50 mm×5 mm×1 mm) having an inversion period Λ=53 μm and an angle α=23° was adopted. The pump light was incident on an end face having a size of 5 mm×1 mm on which an anti-reflection coating adapted to pump light of the present invention was coated. Adopted pump light source was a Nd:YAG laser (manufactured by Hamamatsu Photonics K.K.) having longitudinal single mode; a wavelength of 1064.34 nm; a power of 0.5 mJ; a pulse width of 660 μs; and a repetition frequency of 100 Hz, whose output was amplified to about 8 mJ by a Nd:YAG solid-state optical amplifier. The pump light was then collimated by a telescope optical system to a diameter of 0.6 mm (FWHM), and was incident on the periodic polarization inversion element 102. The polarization of the pump light was linearly polarized light parallel to the z-axis of the crystal. The terahertz wave generated by parametric generation was spatially separated from the pump light by using a perforated parabolic mirror. These conditions were those that had no intersection as shown in FIG. 2.

Figure 3:
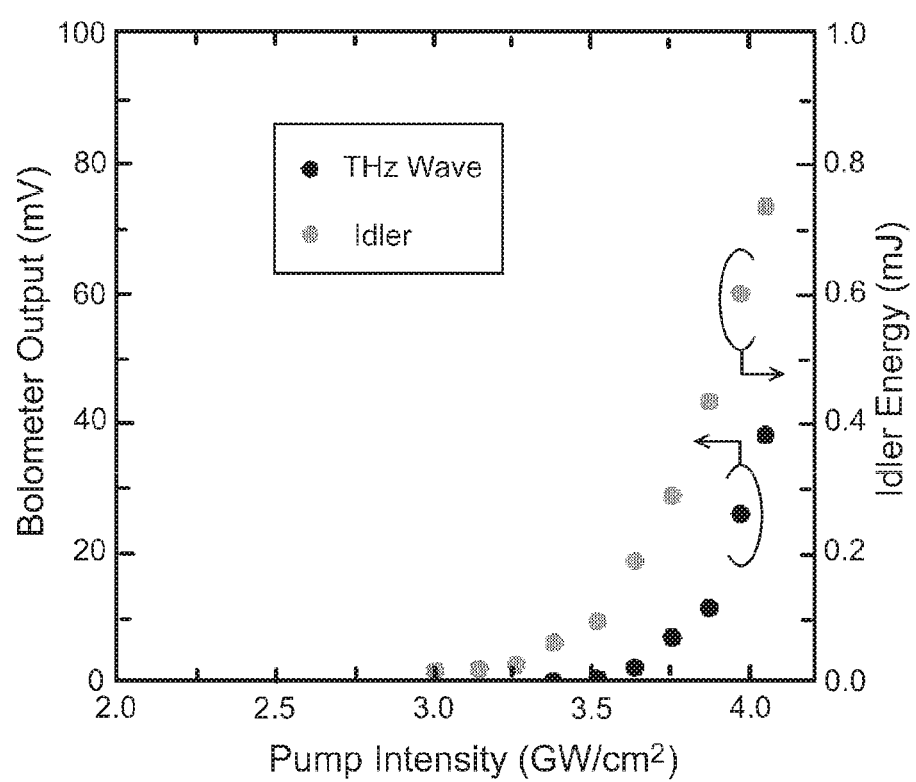
FIG. 3 is a graph showing power of idler light and a detector output corresponding to the power of terahertz waves actually measured by changing pump light intensity in an embodiment of the present invention.

In measurement, first, input/output characteristics of terahertz wave parametric oscillation were examined for the characteristics of output terahertz wave and idler light. The terahertz wave was measured by a cryogenic silicon bolometer detector via a relay optical system, and the idler light was measured by an optical power meter. FIG. 3 is a graph indicating detector output values corresponding to power of the terahertz wave and power values of idler light while changing the pump light intensity. The threshold intensity of the pump light required for generating idler light was 3.0 $GW/cm^2$. The outputs of the idler light and the terahertz wave exponentially increased with respect to the excitation intensity, and the output of the idler light amounted to 0.733 mJ in terms of a value of pulse energy when the excitation intensity was 4.04 $GW/cm^2$. The quantum conversion efficiency at this time was 10% or more. It should be noted that such high efficiency was obtained without using any external resonator and was obtained by a simple configuration that uses only one laser light source at a single wavelength. Since there is no saturation in the output over the range of excitation intensity in the experiment, it is possible to expect a further high output by increasing the excitation intensity of the pump light.

Figure 4:
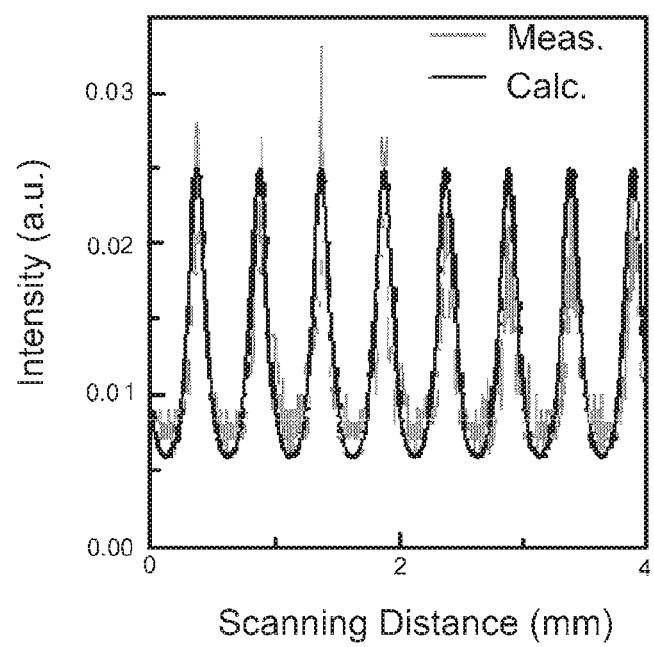
FIG. 4 is a graph showing results of wavelength measurement of terahertz waves in an embodiment of the present invention.

Next, the result of measuring the wavelength of the terahertz wave is shown in FIG. 4. A scanning etalon made of two silicon plates is used for wavelength measurement of the terahertz wave. The horizontal axis of the graph in FIG. 4 represents the moving distance of the silicon plate (mm) and the vertical axis indicates the intensity of the terahertz wave transmitted through the etalon. As a result of the measurement, peaks to be found at integer multiple positions of $\Lambda/2$ were found at intervals of 0.5 mm, thus we confirmed that the wavelength of the output terahertz wave was 1 mm (or 0.3 THz). The idler light wavelength at this time was 1065.51 nm based on the measurement of the spectrum analyzer, which corresponds to the frequency difference value of 0.31 THz between the pump light and the idler light. Thus, it was confirmed that the frequency difference between the pump light and the idler light closely matched the frequency of the output terahertz wave.

Then, the frequency line width of the generated terahertz wave was estimated on the basis of the measurement result obtained by the scanning etalon in FIG. 4, and the terahertz wave frequency line width (FWHM) was 7 GHz. However, considering a low Q value caused by limited reflectance of the silicon plates of the etalon adopted for the measurement, a lower limit of the measurement was in this order. Therefore, there is a possibility that the frequency line width of the terahertz wave has a value smaller than that. Thus, a parametric generated idler light was measured by an optical spectrum analyzer to 2.6 GHz (FWHM), with which we could expect the terahertz wave to have the same value. This value can be a value close to its Fourier transformation limit. From this analysis, we concluded that an output with an excellent monochromatic property having a frequency line width close to the Fourier transformation limit was also obtained for the terahertz wave. The present inventors believe that auto-feedback effect for collinear phase matching caused the extremely narrow frequency line width.

Figure 5:
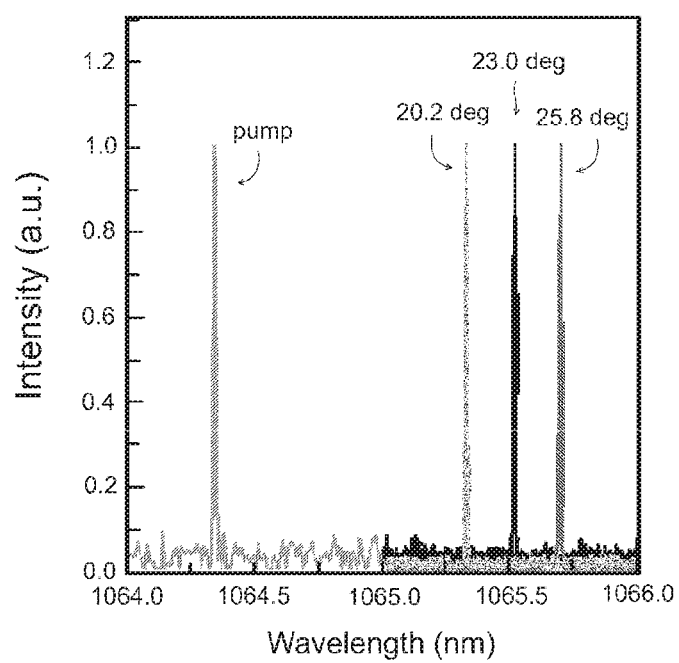
FIG. 5 is a graph showing a spectrum of idler light for rotated crystal combined with one with a pump light source in an embodiment of the present invention.

Furthermore, it was confirmed in this embodiment that the wavelength and frequency of the generated terahertz wave could be modulated by adjusting the direction of the periodic polarization inversion element 102 relative to the pump light LP. The frequency of the terahertz wave could be changed by controlling the phase matching condition, through relative rotation of the periodic polarization inversion element 102 with respect to the pump light LP. The rotation includes any directions around the z-axis so as to increase or decrease the angle $\alpha$ in FIG. 1 as an example. FIG. 5 is a graph indicating a spectrum of idler light when the crystal was rotated, with one for the pump light source. Measurements were made by an optical spectrum analyzer (Advantest, Q8384, resolution 0.01 nm). The pump light had a peak at a wavelength of 1064.34 nm. On the other hand, the peak of the idler light changed by an angle $\alpha$ formed by the inversion structure and the optical axis of the pump light, and was 1065.51 nm at $\alpha=23°$. The wavelength of idler light was varied 1065.33 nm to 1065.70 nm by increasing or decreasing the angle $\alpha$ in a range of $\pm 2.8°$ around 23°. FIG. 5 also shows spectra at an upper limit and a lower limit of an angle $\alpha$. The frequency variable range of the terahertz wave corresponds to the adjustment range of the idler light is 310 GHz±50 GHz. It can be said that the modulation width of ±50 GHz for a slight rotation of ±2.8° of the angle $\alpha$ is considerably wide. The wavelength width of idler light was within the conducted measurement, 0.01 nm (FWHM), which was the spectral analyzer resolution. The pulse width of the idler light at that time was 330 μs, we can conclude that a narrow line width parametric wavelength conversion close to the Fourier transformation limit was obtained. It should be noted that such a narrow line width parametric wavelength conversion was realized in the operation of optical parametric wavelength conversion without using any seed light.

Figure 6:
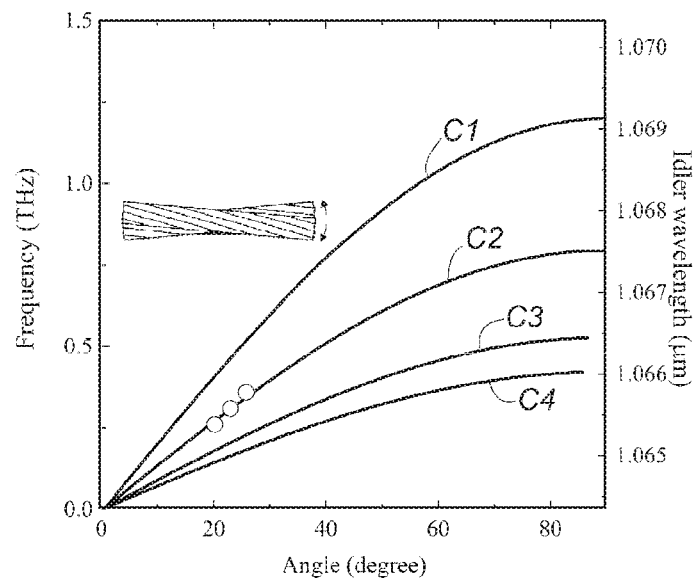
FIG. 6 is a graph showing experimental results and theoretical calculation results on the angular dependence of the periodic polarization inversion element in a backward-propagating operation in an embodiment of the present invention.

2-2. Confirmation of Frequency Modulation in Terahertz Waves and Comparison with Theory Next, for clarifying the relationship between a fact observed in the experiment and the conception by the inventors, we investigated whether the following behaviors were consistent with theoretical prediction or not: behavior of frequency adjustment due to the angle described above; and behaviors of the signal light (terahertz wave) in the backward-propagating wave in the above-described collinear phase matching and the idler light. FIG. 6 is a graph showing experimental results and theoretical calculation results relating to angle dependency of the periodic polarization inversion element 102.

Theoretical calculations are carried out for light at 1064.34 nm, which is the pump light, based on the relationship of equations (2) and (4) and the law of conservation of energy. For comparison, in addition to results for an inversion period $\Lambda$ of 53 μm adopted in the experiment, results for 35, 80, and 100 μm, which fail to satisfy the phase matching condition in the optical wavelength range described above with reference to FIG. 2, are presented as typical examples suitable for use in the same field of the present embodiment. The horizontal axis represents the angle $\alpha$ formed by the inversion structure and the pump light, the pump light transmits in a normal direction of the inversion structure for 90°. In the vertical axis, each curve gives the frequency of the signal light and the wavelength of the idler light at a time, and these scales are attached to the right and left axes. The curves C1 to C4 are arranged in the order of the inversion period $\Lambda=35$, 53, 80, and 100 μm. The experimental results plotted by white circle marks on the graph are those of the above experiment, which are the idler light values and the signal light (terahertz wave) values for angle $\alpha=20.2°$, 23.0°, and 25.8°. FIG. 6 depicts schematic illustration of a periodic polarization inversion element 102 for indicating positions with different values of angle $\alpha$. As can be seen from the graph, the experimental results are not deviated from the curve C2, which represents the calculation results reflecting the experimental conditions, with respect to the frequency or wavelength of the signal light and the idler light.

The experimental results and the calculation results are consistent with each other regarding dependence on the angle α of the frequency of the signal light or the wavelength of the idler light, and it was confirmed that the actual parametric wavelength conversion was occurred in accordance with the phase matching condition of this embodiment. In addition, underlying reason for a significant modulation width, as ±50 GHz in the frequency of the terahertz wave for a change of ±2.8° in the angle α also meets theoretical calculations. Moreover, it is understood that the frequency of, for example, the terahertz wave is changed with a linear dependence on the angle α where the angle α is small, based on a sinusoidal modulation for the angle α in FIG. 6. Furthermore, in order to obtain a terahertz wave having a small frequency change with respect to the angle α, it is effective to increase the angle α and to make the angle α near 90°.

As described above, it was experimentally confirmed that backward-propagating wave output of the terahertz wave having the same wavelength as predicted one was obtained for the special phase matching condition found by the present inventors. That is, the frequency of the terahertz wave was adjusted by controlling the phase matching condition due to the control of the grating vector. On top of that, the frequency modulation capability was confirmed, and it was confirmed that the frequency of the terahertz wave actually changed dramatically by controlling the grating vector. It became apparent from the calculation of the phase matching condition that the frequency variable range, which is a range of the vertical axis of the graph of FIG. 6, amounted to the total frequency range of the sub-terahertz region.

2-3. Additional Findings from Experiments and Theory

By discovering the phase matching condition of the back-ward terahertz wave parametric oscillation, high-efficiency monochromatic frequency variable broadband terahertz wave light source was realized as described above. Since the experimental results of the operation and the theoretical analysis are consistent with each other, correctness of the conception of this embodiment has been confirmed. When we consider the fact that the frequency of the signal light and the wavelength of the idler light are obtained for the angle α based on the phase matching condition (the law of conservation of momentum) and the law of conservation of energy, which laws depend on the inversion period Λ and the angle α, it can be concluded that the theoretical prediction is also generally reasonable. Thus, an additional findings concerning the conception of the present embodiment will be described in a range supported by the above-described theoretical calculation.

First of all, the expected modulation width depends on the inversion period Λ even when the conditions are limited, such as, to the case where a PPLN crystal and a Nd:YAG laser for the pump light are adopted. By changing the inversion period Λ, the adjustment width of the frequency can also be adjusted. At that time, it is also advantageous that the frequency can be continuously adjusted by adjusting the angle α of the periodic polarization inversion element 102 only. Also, even for any value of the inversion periods Λ, the output terahertz wave frequency becomes maximum when the angle α is 90°. Thus, the frequency of the terahertz wave of the output can be easily adjusted over a wide range. In particular, when a PPLN crystal having an inversion period A of 35 μm and a light source having a wavelength of 1 μm are adopted, a terahertz wave at any frequency in a frequency range from a sub-terahertz to 1.2 THz can be generated. It should be noted that a frequency range of a terahertz wave which can be actually output is influenced by absorption or the like exhibited by a material of the periodic polarization inversion element 102.

Furthermore, the collinear phase matching condition in equations (2) and (4) and the arrangement of the wave vectors shown FIG. 1C can be generalized. Specifically, the same operation can be expected not only by the backward-propagating wave, but also by a forward-propagating wave. An operation for obtaining a signal light by a forward-propagating wave is described further.

3. Collinear Phase Matching Conditions Incorporating Grating Vectors (General Theory)

FIG. 7 shows a schematic diagram of momentum within an XY plane (FIG. 1) under various conditions including those described in FIG. 1C, which conditions satisfy the phase matching condition proposed in the present embodiment. The wave vectors $k_p$, $k'_p$, $k_i$ of the pump light, the virtual pump light, and the idler light, respectively, and their magnitudes are large and their tails are shared, only the vicinity of their head part are shown in each figure. Each figure is divided into (a) and (b) as in FIG. 1C. That is, (a) indicates a pump light wave vector $k_p$ and a grating vector $k_\Lambda$, and a virtual pump light wave vector $k'_p$ determined from these, and corresponds to the equation (3). On the other hand, (b) indicates wave vectors $k_i$ and $k_{THz}$ for idler light and signal light (terahertz wave) respectively, where the idler light and the signal light are determined to satisfy the law of conservation of momentum with respect to the virtual pump light wave vector $k'_p$, and the law of conservation of energy with respect to the pump light, while being arranged in an efficient collinear arrangement, and corresponds to equations (2) and (4). In FIGS. 7A-7E, a pump light wave vectors $k_p$ are identical, and it should be noted that a grating vectors $k_\Lambda$ having a constant magnitude change their orientation as right, upper right, up, upper left, and left on the sheet. The orientations correspond to an angle α (FIG. 1B). Vector addition of a pump light wave vector $k_p$ and the grating vector $k_\Lambda$ makes the virtual pump light wave vector $k'_p$ for these figures. The idler light is in parallel with the virtual pump light wavelength vector $k'_p$.

FIG. 7A shows a case where the angle α is 90°. In this case, since the grating vector $k_\Lambda$ is in parallel with the pump light wavelength vector $k_p$, the virtual pump light wave vector $k'_p$ is also in parallel with the pump light wavelength vector $k_p$. By satisfying the collinear phase matching with respect to the virtual pump light wave vector $k'_p$, the idler light wave vector $k_i$ and the signal light wave vector $k_{THz}$ that satisfy the law of conservation of energy are opposite to each other. As a result, a terahertz wave as a signal light serving as a backward-propagating wave is generated with respect to the pump light.

FIG. 7B shows a case where the angle α is 45° and corresponds to the configuration of FIG. 1. In this case, the virtual pump light wave vector $k'_p$ is slightly inclined with respect to the pump light wave vector $k_p$, and has a norm smaller than that of the pump light wave vector $k_p$. In this example, by satisfying the collinear phase matching with respect to the virtual pump light wave vector $k'_p$ and satisfying the law of conservation of energy, the idler light wave vector $k_i$ and the signal light wave vector $k_{THz}$ become opposite to each other, a terahertz wave which is a signal light serving as a backward-propagating wave is generated.

In comparison with FIG. 7A, a signal light wave vector $k_{THz}$ is shortened to obtain a terahertz wave at decreased frequency.

FIG. 7C shows a case where the angle α is 0°. The virtual pump light wave vector $k'_p$ has a norm almost the same as that of the pump light wave vector $k_p$ and is inclined. In this case, there is no combination of signal light and idler light satisfying a phase matching condition that is considered to be collinear phase matching with respect to the virtual pump light wave vector $k'_p$. As a result, the terahertz wave and the idler light are not generated when the angle α is 0°. The terahertz wave and the idler light are not shown in FIG. 7C.

FIG. 7d shows a case where the angle α is −45°. A virtual pump light wave vector $k'_p$ is slightly inclined with respect to the pump light wave vector $k_p$ and has a norm larger than that of the virtual pump light wave vector $k'_p$. To achieve this large norm while satisfying collinear phase matching, the idler light wave vector $k_i$ and the signal light wave vector $k_{THz}$ are directed in the same direction. Thus, the terahertz wave which is the signal light is generated in a direction substantially a forward-propagating wave to the pump light. Also, even when the virtual pump light wave vector $k'_p$ may have a norm larger than that of the pump light wave vector $k_p$, since the grating vector $k_A$ is very small, it is possible to generate a terahertz wave of a forward-propagating wave satisfying the law of conservation of energy to the pump light.

FIG. 7E shows a case where the angle α is −90°. A virtual pump light wave vector $k'_p$ is in parallel with the pump light wave vector $k_p$ and has a norm greater than that of the pump light wave vector $k_p$. The idler light wave vector $k_i$ and the signal light wave vector $k_{THz}$ that satisfy the collinear phase matching with respect to the virtual pump light wave vector $k'_p$ and that satisfy the law of conservation of energy are both parallel to the pump light wave vector $k_p$, a terahertz wave which is a signal light serving as a forward-propagating wave is generated.

Figure 8:
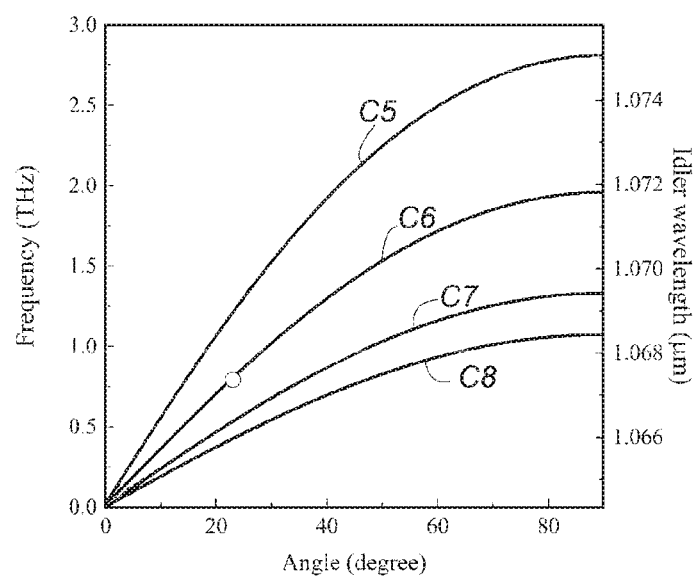
FIG. 8 is a graph showing experimental results and theoretical calculation results on the angular dependence of the polarization inversion element in a forward-propagating operation in an embodiment of the present invention.

FIGS. 7A-7C indicate the frequency change of the terahertz wave and the wavelength change of the idler light shown in FIG. 6. Similarly, the calculation results (FIG. 8) are also shown for FIG. 7C-7E. The horizontal axis in FIG. 8 represents an angle to a positive value. The curves C5 to C8 are arranged in the order of the inversion period Λ=35, 53, 80, and 100 μm. In a comparison with FIG. 6, the modulation width of the wavelength of the vertical axis, that is, the frequency of the terahertz wave and the idler light is large in FIG. 8. This is according to the relative difference in magnitudes of the virtual pump light wave vector $k'_p$ and the pump light wave vector $k_p$.

FIG. 9 Includes schematic diagrams depicting a structure of a terahertz generation device 110 for generating signal light of a terahertz wave of a forward-propagating wave: a plan view schematically showing a typical arrangement of a nonlinear optical element, pump light, signal light, and idler light (FIG. 9A), and a schematic diagram of moment showing the relationship between the wave vectors (FIG. 9B). For the nonlinear optical element a periodic polarization inversion element 112 similar to the periodic polarization inversion element 102 may be employed. The direction in which a signal light (terahertz wave) is generated in response to a pump light LP from a pump light source 114 is the other side of the nonlinear optical element compared with the case in FIG. 1B; thus the signal light and the idler light are in parallel with the crystal. However, since the refractive index of the crystal has wavelength dependency, the signal light (terahertz wave) and the idler light are not necessarily parallel to each other after they are emitted from the crystal.

4. Experimental Verification 2

The operation of the above-described forward-propagating wave was confirmed by an experiment as in the case of the backward-propagating wave. A pump light, a PPLN crystal, and a measuring device adopted were those that were adopted, and necessary changes were made in light of the difference in directions of the signal light (terahertz wave). The generation of the terahertz wave in the forward-propagating wave was confirmed at an angle α=23°. A measured value of the confirmed terahertz wave is shown in FIG. 8 by a white circle mark.

As described above, the present embodiment may be operated to generate a terahertz wave as the signal light of a forward-propagating wave with respect to the pump light. Also in this case, it is advantageous that the interaction volume due to the collinear phase matching is large, the terahertz wave can be generated without using a feedback optical system such as an external resonator. Furthermore, the frequency modulation of the terahertz wave by the angle can be realized in the case of a forward-propagating wave.

5. Utilization of Angle-Based Modulation

From the results of the measurement data and the theoretical analysis shown in FIGS. 6 and 8, the frequency of the terahertz wave can be modulated by simply adjusting the relative direction of pump light and periodic polarization inversion element 102. Based on theoretical prediction, its modulation width is relatively large. Therefore, in the present embodiment, when a mechanism for changing a mutual direction between the incident direction of the pump light LP and the periodic polarization inversion element 102 are provided, the terahertz wave generation device becomes preferable that can generate a terahertz wave with a variable frequency. A typical example of such a mechanism includes a direction adjustable stage for a periodic polarization inversion element 102, and an any beam scanning means for changing an irradiation direction of the pump light LP to the periodic polarization inversion element 102.

Figure 10A:
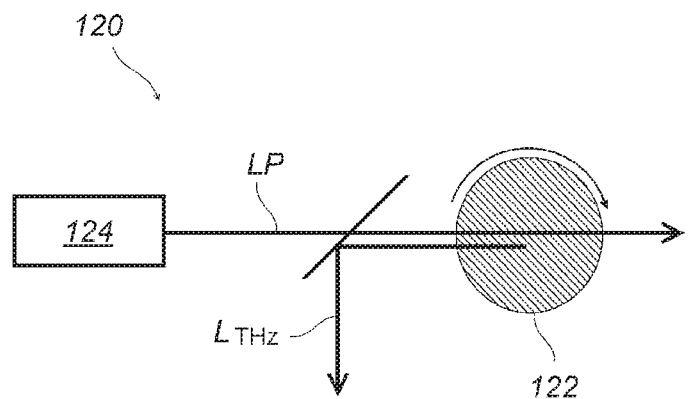
FIGS. 10A and 10B depict configurations of the terahertz wave generating devices in which a terahertz wave as a signal light is generated by way of a backward-propagating wave and a forward-propagating wave, respectively.
Figure 10B:
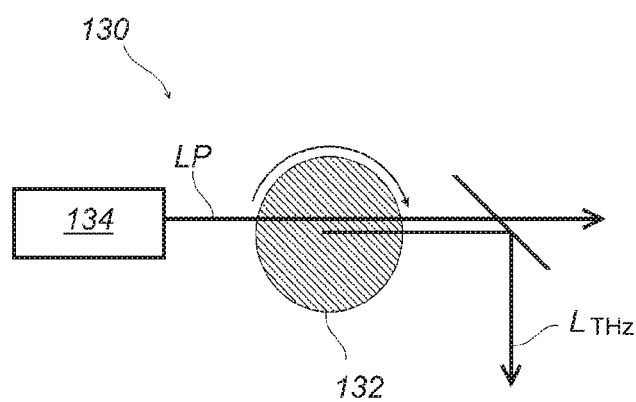
Figure 11:
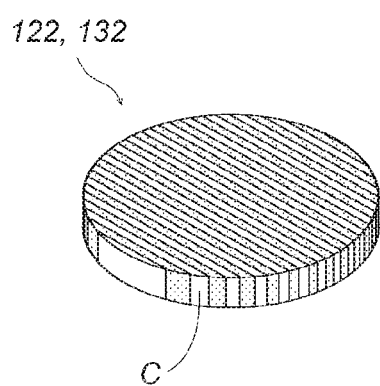
FIG. 11 is a perspective view indicating a shape of a periodic polarization inversion element suitable for use in a rotation mechanism in an embodiment of the present invention.

In addition, it is preferable that the mechanism is a rotary mechanism, which causes frequency scanning in the terahertz wave in accordance with the rotational phase. FIG. 10 includes schematic diagrams depicting structures of frequency scan type terahertz wave generation devices 120 and 130 with a rotation mechanism for a periodic polarization inversion element. FIGS. 10A and 10B depict configurations of the terahertz wave generating devices in which a terahertz wave as a signal light is generated by way of a backward-propagating wave and a forward-propagating wave, respectively. Also, FIG. 11 is a perspective view indicating a shape of a periodic polarization inversion element 122, 132 suitable for use in a rotation mechanism.

A periodic polarization inversion element 122, 132 used in a rotation mechanism is generally a circular plate shape, and its axis of rotation and an axis of rotation of the mechanism (not shown) are aligned with each other. The pump light LP is supplied by a pump light source 124, 134 and the generated signal light $L_{THz}$ (terahertz wave) and an idler light LI is emitted from a cylindrical surface C forming the outer periphery of the circular plate. An antireflection coating for controlling Fresnel reflection is applied, if necessary. When such a circular plate crystal is rotated, the angle α goes to and fro within a range of 0 to 90° twice per rotation, which results in four times scanning of the frequency in the signal light $L_{THz}$. The frequency scan width at that time may be around 100 GHz or about 1 THz. The circular plate crystal can be easily rotated at a high speed, and can also function as a light source for scanning the frequency at a very high speed. Since a light source having a high scanning speed has never been obtained for a terahertz wave light source, the present invention is useful in spectroscopy using a terahertz wave. As shown in FIGS. 10A and 10B, a terahertz wave which is a signal light $L_{THz}$ may be generated by two arrangements of a backward-propagating wave and a forward-propagating wave with respect to the pump light LP. In any case, the signal light wave vector becomes anti-parallel or parallel with respect to the virtual pump light wave vector, in a general angle α, the signal light wave vector is slightly deviated from the pump light wave vector in their directions, while the deviation depends on the angle.

6. Optical Parametric Amplifiers

Figure 12A:
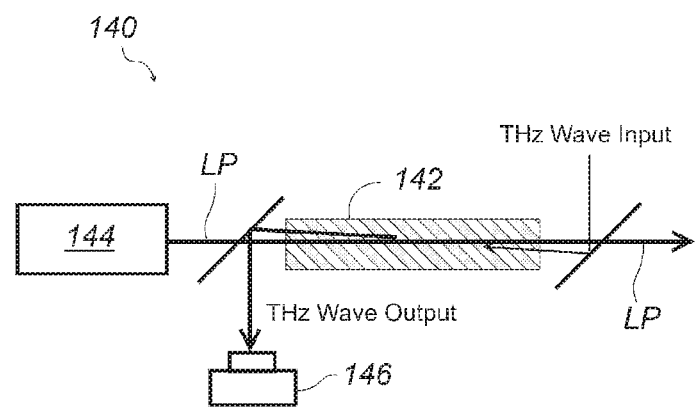
FIGS. 12A and 12B depict an arrangement of an optical parametric amplifier for a backward-propagating wave and one for a forward-propagating wave, respectively.
Figure 12B:
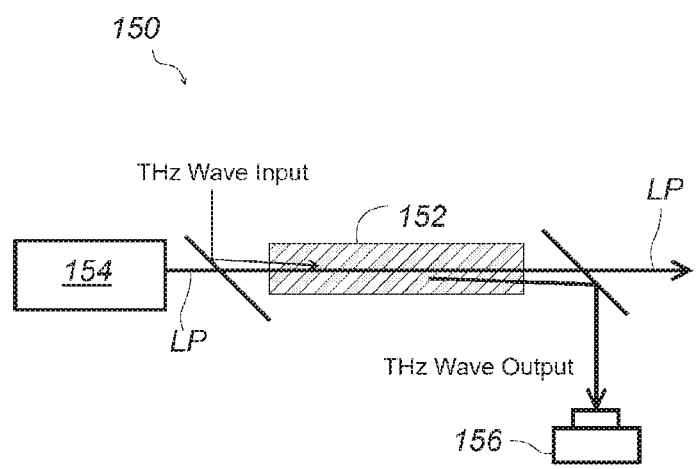

The phase matching conditions proposed in this embodiment may become conditions for generating an optical parametric amplification effect with high efficiency. For this purpose, the present embodiment can also be implemented as an optical parametric amplifier for amplifying a terahertz wave by an optical parametric effect. FIG. 12 includes schematic diagrams depicting structures of optical parametric amplifiers according to the present embodiment; FIGS. 12A and 12B depict an arrangement of an optical parametric amplifier 140, 150 for a backward-propagating wave and one for a forward-propagating wave, respectively. Terahertz waves to be amplified are incident on the periodic polarization inversion elements 142, 152, in arrangements for the backward- and forward-propagating waves, respectively, together with the pump light LP from the light source 144, 154. The nonlinear optical effect in the periodic polarization inversion elements 142, 152 is the same as one described with reference to FIGS. 1 and 9. We can assume the virtual pump light wave vector $k'_p$ obtained by vector addition or subtraction of grating vector $k_\Lambda$ with respect to pump light wave vectors $k_p$, which is incident on the periodic polarization inversion elements 142, 152 having grating vector $k_A$. What to be amplified is a terahertz wave input that satisfies the collinear phase matching condition with respect to the virtual pump light wave vector $k'_p$. The collinear phase matching condition may be satisfied in both cases in anti-parallel with the virtual pump light wave vector $k'_p$ (FIG. 12A; case for backward-propagating wave) and in parallel with the virtual pump light wave vector $k'_p$ (FIG. 12B; case for forward-propagating wave); therefore, a terahertz wave satisfying either cases can act as a seed light and will be amplified by the energy of the pump light LP. When amplification is realized in terahertz waves, a pump light whose intensity is reduced travels inside the periodic polarization inversion element 102 and a pump light that travels there and an idler light are output. The pump light wave vector $k_p$ and the virtual pump light wave vector $k'_p$ are generally slightly different in direction, a terahertz wave which is most efficiently used as a seed light and has a high amplification factor, in general, is deviated form from the complete anti-parallel arrangement and from the complete parallel arrangement with respect to the pump light. The amplified signal light has the same wavelength as that of the terahertz wave to be inputted, a coherence is maintained with respect to the input terahertz wave. By adjusting the direction of the nonlinear optical element or by rotating the nonlinear optical element, even for the optical parametric amplifier 140, 150, it is possible to adjust the amplification operation to match the frequency of the terahertz wave, and it is also possible to amplify while conducting spectroscopy over a range of the terahertz wave.

7. Terahertz Wave Detecting Device

Furthermore, the optical parametric amplifiers 140, 150 according to the present embodiment can also be used as a terahertz wave detection device by providing with a detector 146, 156, which is a terahertz wave detection device. In this case, both the backward- and forward-propagating wave arrangements can be adopted. When signal light amplified as in FIGS. 12A and 12B is detected by detectors 146, 156 added for the terahertz wave detection device, a detector for a terahertz range, such as a bolometer, can be adopted. Moreover, it is possible to realize a detection device exhibiting high sensitivity adapted to the frequency of the terahertz wave detected by the detection means by adjusting the direction of the nonlinear optical element or by rotating the nonlinear optical element.

Figure 13A:
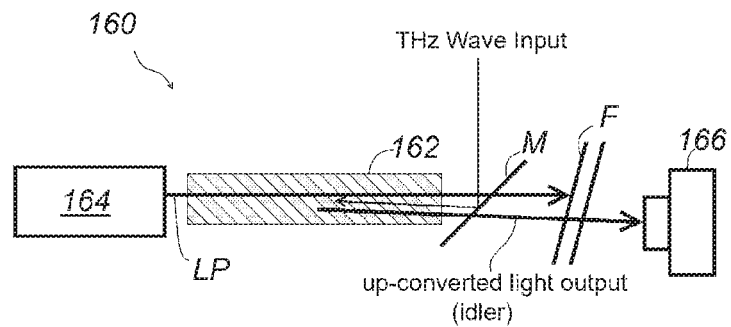
FIGS. 13A and 13B depict one for a terahertz wave of a backward-propagating wave (FIG. 13A) and another of forward-propagating wave (FIG. 13B).
Figure 13B:
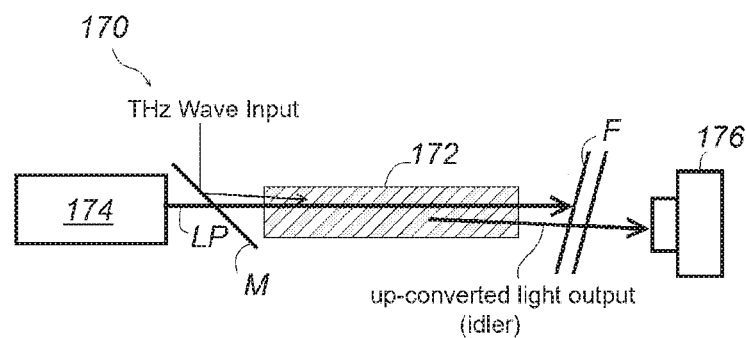

Alternatively, when a detector for idler light may be employed, a terahertz wave detection device by up-conversion can also be configured. FIG. 13 includes schematic diagrams depicting configurations of terahertz wave detection devices 160, 170; FIGS. 13A and 13B depict one for a terahertz wave of a backward-propagating wave (FIG. 13A) and another of forward-propagating wave (FIG. 13B). The pump light LP from the pump light sources 164, 174 is incident on a periodic polarization inversion element 162, 172, and at the same time, the terahertz wave is incident thereon in a direction for the backward-propagating wave (FIG. 13A) or a direction for the forward-propagating wave (FIG. 13B) with respect to the pump light LP via a mirror M having an appropriate reflection range. The up-conversion means that light of a higher frequency which is idler light is generated while the input of the terahertz wave is used as seed light, which is advantageous in selection of detectors. That is, in the band of the idler light, higher sensitivity and response than a detector for terahertz waves, such as a fast silicon detector, can be easily obtained and adopted. The idler light has a frequency equal to the frequency difference between the pump light and the signal light, or the terahertz wave, due to requirement of the law of conservation of energy. For example, in the case when the pump light has a wavelength around 1 μm and the terahertz wave is detected, the idler light has a wavelength that is slightly longer than that of the pump light (FIGS. 5, 6, and 8). For this reason, the idler light is preferably detected by detectors 166, 176 after being separated from the pump light, for example, via a wavelength filter F. Moreover, even for the terahertz wave detection devices 160, 170 it is possible to realize a detection device exhibiting high sensitivity adapted to the frequency of the terahertz wave detected by the detection means by adjusting the direction of the periodic polarization inversion element 162, 172 or by rotating the periodic polarization inversion element 122, 132 in FIG. 11 that are adapted in place of the periodic polarization inversion element 162, 172.

Figure 14A:
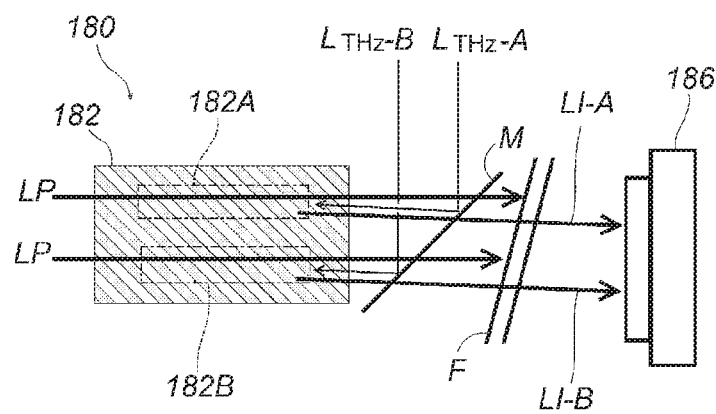
FIG. 14 is a schematic diagram illustrating a configuration of an imaging detection device utilizing up-conversion in an embodiment of the present invention.
Figure 14B:
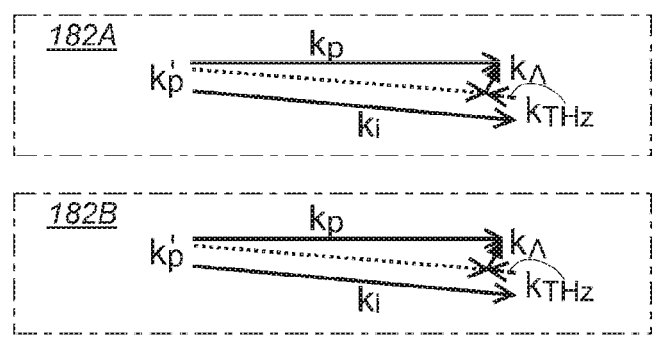

Furthermore, in the up-conversion configuration, imaging utilizing collinear phase matching conditions is also possible. FIG. 14 is a schematic diagram showing a configuration of an imaging detection device 180 adopting up-conversion. The terahertz wave may exhibit intensity distribution in accordance with the position, caused by for example, irradiation of an object by the terahertz wave. In the figure, a terahertz wave having intensities $L_{THz}$-A, $L_{THz}$-B for different positions is depicted. The terahertz wave is incident on a periodic polarization inversion element 182 having a sufficient size via an appropriate mirror M if necessary. The pump light LP is, for example, is incident while its beam size is expanded by a telescope optical system (not shown), or while it is scanning. In this way, the pump light LP is maintained at a constant angle with respect to the inversion structure in the periodic polarization inversion element 182, and the terahertz wave is incident from the other side of the pump light (FIG. 14A). Intensities $L_{THz}$-A, $L_{THz}$-B due to the distribution of the terahertz wave generate idler light while satisfying a collinear phase matching in periodic polarization inversion regions 182A and 182B respectively in the crystal of the periodic polarization inversion element 182. FIG. 14B is a schematic diagram of momentum illustrating a relationship of satisfied collinear phase matching at polarization inversion regions 182A and 182B in the crystal. The phase matching condition at polarization inversion regions 182A and 182B is the same as that shown in FIG. 7B. The idler light is emitted in a direction in which the collinear phase matching is established at each of the polarization inversion regions 182A and 182B, the idler light is generated according to intensities $L_{THz}$-A, $L_{THz}$-B. A detector 186 is, for example, a one-dimensional array type detector, then the intensities LI-A, LI-B of the idler light divided into the pump light by the wavelength filter F carry the intensities $L_{THz}$-A, $L_{THz}$-B or intensity distribution is detected. Since the array type detector is easily available for the range of the idler light than for the frequency range of the terahertz wave, such a configuration is advantageous for imaging. It is to be noted that FIG. 14 shows only a configuration of a detection device for imaging due to the arrangement of a backward-propagating wave, it is possible to configure another imaging device (not shown) in a similar manner by placing a terahertz input surface of the periodic polarization inversion element 182 on the other side.

9. Utilization of Multiple Cyclic Devices

Figure 15A:
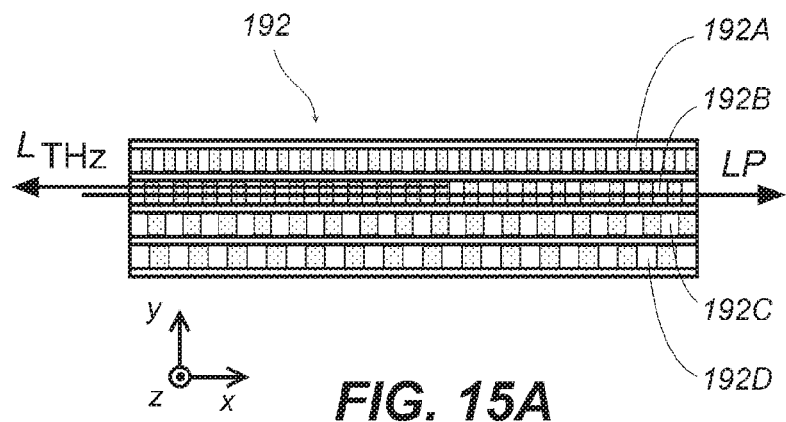
FIG. 15 includes a schematic plan view showing a configuration of a periodic polarization inversion element having a plurality of periods in an embodiment of the present invention (FIG. 15A) and a graph of a frequency calculation value of a terahertz wave (FIG. 15B).
Figure 15B:
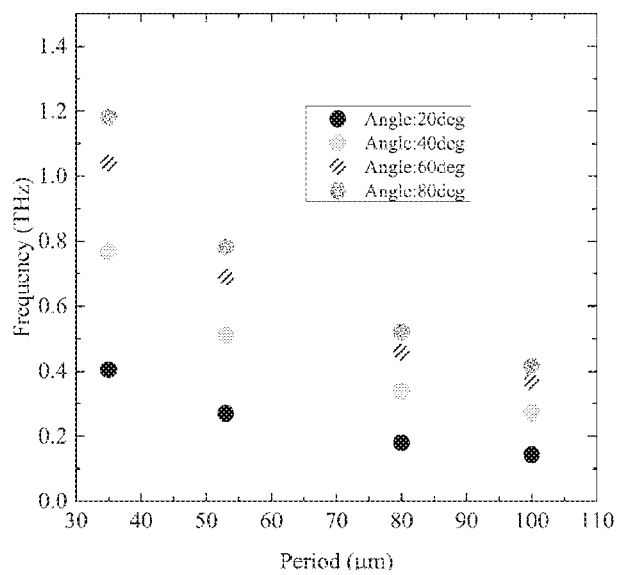

In a terahertz wave generation device, an optical parametric amplifier, and a detection device proposed in this embodiment, the frequency of the generated terahertz wave can be adjusted by the inversion period Λ. Therefore, the frequency of the terahertz wave can be adjusted in a wide range with a simple configuration. For example, in the case when the polarization inversion is used, a periodic polarization inversion element having different periods such that the inversion period is changed for positions, such as by devising the electrode pattern. FIG. 15 includes a schematic plan view showing the configuration of a periodic polarization inversion element 192 having such a plurality of cycles (FIG. 15A) and a graph of the frequency of the terahertz wave calculated at the four kinds of cycles and the four kinds of angles α (FIG. 15B). The pump light is incident on any one of the optical paths that extend in the x direction (192A-192D) with an inversion structure of different cycles. When the optical axis of the pump light LP is fixed, such a periodic polarization inversion element 192 is shifted in they direction and the polarization inversion region 192A-192D can be switched to each other, and the inversion period A can be easily selected. Thus, the frequency can be modulated in a wide range. The width in the y direction of each of the polarization inversion regions 192A to 192D may be configured so as to be narrower as shown in the figure, or to a certain extent so that the angle of the inversion structure with respect to the pump light LP can be adjusted. A wide frequency range obtained by switching an inversion period Λ is advantageous, as it brings a wider frequency range of a terahertz wave, in addition, the optical parametric amplifier has an advantage of expanding a frequency range.

10. Temperature Adjustment

For the terahertz wave generation device 100 proposed in this embodiment, for example, the refractive index varies according to the temperature of a periodic polarization inversion element 102 as a nonlinear optical element. This property can be used for precisely adjusting the frequency of the generated terahertz wave. It also utilized for suppressing frequency drift of the generated terahertz wave merely by controlling the temperature to a target temperature.

11. Applications

A terahertz wave generation device, an optical parametric amplifier of this embodiment, a terahertz wave detection device, and a nonlinear optical element in the present invention can be applied to the general technical field for utilizing or inspecting a terahertz wave. Such fields are listed as non-limiting lists, for example, non-destructive inspection, gas sensing, terahertz OCT (optical CT), and can also include a terahertz communication. For the terahertz communication it is possible to employ any sort of nonlinear crystals described in the present embodiment for a part of an optical parametric amplifier, a position-sensitive amplifier, and a phase detector or the like.

The embodiments of the present invention have been concretely described above. Each of the above-described embodiments, variations and specific examples has been described for the purpose of explaining the inversion; therefore, the scope of the inversion of the present application should be determined based on the claims. Also, modifications within the scope of the present inversion including other combinations of the respective embodiments are also included in the scope of the claims.

INDUSTRIAL APPLICABILITY

The present invention is applicable to any devices that use terahertz waves.

REFERENCE SIGNS LIST

100, 110, 120, 130 terahertz wave generation device
140, 150 optical parametric amplifier
160, 170, 180 terahertz wave detection device
102, 112, 122, 132, 142, 152, 162, 172, 182, 192 periodic polarization inversion element
182A, 182B, 192A-192D polarization inversion regions
104, 114, 124, 134, 144, 154, 164, 174 pump light source
146, 156, 166, 176, 186 detector

The invention claimed is:
1. A terahertz wave generation device, comprising:
a pump light source for generating pump light of a single wavelength; and
a nonlinear optical element having a periodic structure in which polarization or crystal orientation is periodically inverted in an inversion period,
wherein the nonlinear optical element is configured to generate idler light and signal light when the pump light is incident thereon, the idler light and the signal light satisfying a collinear phase matching condition with respect to a virtual pump light wave vector and the law of conservation of energy with respect to the pump light, and
wherein the virtual pump light wave vector is obtained by vector addition or subtraction of a grating vector corresponding to the inversion period and a pump light wave vector in the nonlinear optical element.

2. The terahertz wave generation device according to claim 1, wherein
the nonlinear optical element is arranged so that the pump light in the nonlinear optical element is inclined with respect to the periodic structure, and so that the grating vector of the periodic structure is not parallel or anti-parallel to the wave vector of the pump light in the nonlinear optical element.

3. The terahertz wave generation device according to claim 1, wherein
the inversion period of the nonlinear optical element has a value in such a range that the pump light does not satisfy a phase matching with respect to a light wave or a terahertz wave.

4. The terahertz wave generation device according to claim 1,
wherein the collinear phase matching condition holds among the following three vectors:
the virtual pump light wave vector,
an idler light wave vector that is arranged in parallel with respect to the virtual pump light wave vector and is greater than the virtual pump light wave vector; and
a signal light wave vector that is arranged in anti-parallel with respect to the virtual pump light wave vector, and
wherein the signal light is a terahertz wave of a backward-propagating wave traveling generally in a reverse direction of the pump light.

5. The terahertz wave generation device according to claim 4, wherein the virtual pump light wave vector is smaller than the pump light wave vector.

6. The terahertz wave generation device according to claim 1,
wherein the collinear phase matching condition holds among the following three vectors:
the virtual pump light wave vector,
an idler light wave vector that is arranged in parallel with respect to the virtual pump light wave vector and is smaller than the virtual pump light wave vector, and
a signal light wave vector that is arranged in parallel with respect to the virtual pump light wave vector, and
wherein the signal light is a terahertz wave of a forward-propagating wave traveling generally in a direction of the pump light.

7. The terahertz wave generation device according to claim 6, wherein the virtual pump light wave vector is greater than the pump light wave vector.

8. The terahertz wave generation device according to claim 1, wherein a wavelength of the terahertz wave, which is the signal light, is adjusted by the angle of the nonlinear optical element with respect to the pump light.

9. The terahertz wave generation device according to claim 8, further comprising a mechanism for changing relative direction between the incident direction of the pump light and the nonlinear optical element.

10. The terahertz wave generation device according to claim 8, wherein the mechanism is a rotation mechanism configured to modulate the wavelength of the terahertz wave by rotating at least one of the incident direction of the pump light and the nonlinear optical element.

11. The terahertz wave generation device according to claim 1, wherein the nonlinear optical element has a waveguide structure for propagating terahertz waves inside the nonlinear optical element.

12. The terahertz wave generation device according to claim 1, further comprising a temperature control device of the nonlinear optical element.

13. The terahertz wave generation device according to claim 12, wherein the nonlinear optical element is lithium niobate, and the temperature control device cools the nonlinear optical element.

14. An optical parametric amplifier, comprising:
a pump light source for generating pump light of a single wavelength; and
a nonlinear optical element having a periodic structure in which polarization or crystal orientation is periodically inverted in an inversion period,
wherein the nonlinear optical element is configured to output one or both of signal light and idler light when the pump light and incident light are incident thereon, the signal light having a wavelength identical to that of the incident light, the incident light being a terahertz wave satisfying a collinear phase matching condition with respect to a virtual pump light wave vector and the law of conservation of energy with respect to the pump light,
wherein the virtual pump light wave vector is obtained by vector addition or subtraction of a grating vector corresponding to the inversion period and a pump light wave vector in the nonlinear optical element, and
wherein the idler light is to satisfy the collinear phase matching condition and the law of conservation of energy with respect to the pump light and the signal light.

15. A terahertz wave detector, comprising:
the parametric amplifier as recited in claim 14; and
a detector for detecting signal light or the idler light which is output from the nonlinear optical element in response to a terahertz wave satisfying the collinear phase matching condition with respect to the pump light wave vector and the grating vector, the signal light having a wavelength identical to that of the incident light, the terahertz wave being the incident light to the optical parametric amplifier.

16. A nonlinear optical element having a periodic structure in which polarization or crystal orientation is periodically inverted in an inversion period,
wherein the periodic structure is configured to generate one or both of idler light and signal light when the pump light of a single wavelength is incident thereon, the idler light and the signal light satisfying a collinear phase matching condition with respect to a virtual pump light wave vector and the law of conservation of energy with respect to the pump light,
wherein the virtual pump light wave vector is obtained by vector addition or subtraction of a grating vector corresponding to the inversion period and a pump light wave vector in the nonlinear optical element, and
wherein the collinear phase matching condition holds among the following three vectors:
the virtual pump light wave vector,
an idler light wave vector that is arranged in parallel with respect to the virtual pump light wave vector and is greater than the virtual pump light wave vector; and
a signal light wave vector that is arranged in anti-parallel with respect to the virtual pump light wave vector is satisfied by grating vector virtual pump light wave vector is obtained by vector addition or subtraction of a grating vector corresponding to the inversion period and a pump light wave vector in the nonlinear optical element and
wherein nonlinear optical element is configured to propagate the pump light in a inclined direction with respect to the periodic structure.

17. The nonlinear optical element according to claim 16, wherein the pump light in the nonlinear optical element is inclined with respect to the periodic structure, and wherein nonlinear optical element is configured to generate either or both of the idler light and the signal light when the grating vector of the periodic structure is not parallel or anti-parallel to the wave vector of the pump light in the nonlinear optical element.

18. The nonlinear optical element according to claim 16, wherein the inversion period of the nonlinear optical element has a value in such a range that the pump light does not satisfy a phase matching with respect to a light wave or a terahertz wave.

19. The nonlinear optical element according to claim 16, wherein the nonlinear optical element has a circular plate shape with a cylindrical edge surface.

20. A nonlinear optical element having a periodic structure in which polarization or crystal orientation is periodically inverted in an inversion period,
wherein the periodic structure is configured to generate one or both of idler light and signal light when the pump light of a single wavelength is incident thereon, the idler light and the signal light satisfying a collinear phase matching condition with respect to a virtual pump light wave vector and the law of conservation of energy with respect to the pump light,
wherein the virtual pump light wave vector is obtained by vector addition or subtraction of a grating vector corresponding to the inversion period and a pump light wave vector in the nonlinear optical element, and
wherein the collinear phase matching condition holds among the following three vectors:
the virtual pump light wave vector,
an idler light wave vector that is arranged in parallel with respect to the virtual pump light wave vector and is smaller than the virtual pump light wave vector, and
a signal light wave vector that is arranged in parallel with respect to the virtual pump light wave vector, and
wherein nonlinear optical element is configured to propagate the pump light in a inclined direction with respect to the periodic structure.

* * * * *